(12) United States Patent
Winjngaarden et al.

(10) Patent No.: US 6,262,145 B1
(45) Date of Patent: *Jul. 17, 2001

(54) PROCESS FOR THE EXTRACTION OF MATERIAL FROM MULTI-PHASE SYSTEMS

(75) Inventors: Rudolf Jacobus Winjngaarden, Noord-Holland (NL); Ye-Mon Chen; David Karl Schisla, both of Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,013

(22) Filed: Dec. 15, 1999

Related U.S. Application Data

(62) Division of application No. 08/950,683, filed on Oct. 15, 1997.
(60) Provisional application No. 60/030,170, filed on Oct. 31, 1996.

(51) Int. Cl.⁷ ..................................................... B01D 11/10
(52) U.S. Cl. ............................................................ 523/332
(58) Field of Search ................................................ 523/332

(56) References Cited

U.S. PATENT DOCUMENTS

| | | | |
|---|---|---|---|
| 4,143,085 | 3/1979 | Funada et al. | 260/677 |
| 4,314,974 | 2/1982 | Libby | 423/8 |
| 4,349,415 | 9/1982 | DeFilippi | 203/14 |
| 4,395,330 | 7/1983 | Auboir | 208/309 |
| 4,515,695 | 5/1985 | Knupp | 210/634 |
| 4,545,901 | 10/1985 | Schneider | 210/634 |
| 4,857,632 | 8/1989 | Ahlberg et al. | 528/487 |
| 4,970,254 | 11/1990 | Willis et al. | 525/314 |
| 5,001,199 | 3/1991 | Hoxmeier | 525/338 |
| 5,166,277 | 11/1992 | Goodwin et al. | 525/338 |
| 5,229,464 | 7/1993 | Erickson et al. | 525/314 |
| 5,338,824 | 8/1994 | Diaz et al. | 528/482 |
| 5,350,834 | 9/1994 | Bobsein et al. | 528/485 |
| 5,376,745 | 12/1994 | Haldlin et al. | 526/178 |
| 5,378,761 | 1/1995 | St. Clair | 525/111 |
| 5,426,176 | 6/1995 | Teshima et al. | 528/490 |
| 5,543,472 | 8/1996 | Stevens et al. | 525/387 |
| 5,554,691 | 9/1996 | St. Clair | 525/111 |

FOREIGN PATENT DOCUMENTS

| | | | |
|---|---|---|---|
| 2851805 | 6/1980 | (DE) . | |
| 0036283 | 9/1991 | (EP) | B01D/11/04 |

Primary Examiner—Paul R. Michl
(74) Attorney, Agent, or Firm—Beverlee G. Steinberg

(57) ABSTRACT

A method for extracting and separating extractive components from fluids is provided. A first fluid and an extraction fluid are added to a vessel, thereby creating a two-phase two-layer system, wherein the first fluid and the extraction fluid are discrete and the two-phase system has a first fluid/extraction fluid interface. The two-phase system is then agitated, wherein the first fluid phase and the extraction fluid phase remain as substantially discrete layers. A means for communication between the first fluid and the extraction fluid is provided. The communication of the phases results in the extractive components being extracted from the first fluid into the extraction fluid. Agitation is stopped and the first fluid is recovered having reduced extractive components.

17 Claims, No Drawings

PROCESS FOR THE EXTRACTION OF MATERIAL FROM MULTI-PHASE SYSTEMS

This is a division of application Ser. No 08/950,683 filed Oct. 15. 1997, the entire disclosure of which is hereby incorporated by reference.

This application claims the benefit of the filing of U.S. Provisional Patent Application Serial No. 60/030,170, filed Oct. 31, 1996.

FIELD OF THE INVENTION

This invention pertains to segregated mixing and phase separation techniques, in particular a method of extraction from multi-phase systems, particularly two-phase systems wherein the phases are fluid, and/or slurry.

BACKGROUND OF THE INVENTION

Many processes require an extraction step in recovering the desired product. In some extraction processes undesirable impurities may be removed from a fluid system while in other extraction processes the product may be removed from the fluid system. Common extraction involves placing a fluid containing the component to be extracted (the extractive component) in direct contact, usually by rapid mixing, with a second fluid (the extraction fluid) which attracts or traps the extractive component, thereby reducing the level of that component in the first fluid. Unfortunately, extraction by conventional methods many times leaves entrained phases of the extraction fluid in the fluid which is being acted upon. These entrained phases contain the very components which are meant to be extracted from the first fluid. As an example, polymerization and hydrogenation of polymer cements requires the use of polymerization initiators and hydrogenation catalyst. Extraction of the initiator and/or catalyst is required to produce a polymer relatively free of metals found in the initiator and/or catalyst. Conventional methods of extraction are to either disperse acids, such as sulfuric or phosphoric acid, into the polymer cement, or to disperse polymer cement into acids, both methods commonly accomplished by rapid mixing for a period of time, followed by allowing the material to settle and separate. Extraction by this conventional method leaves entrained acid phases in the polymer cement. Metal impurities successfully extracted to the acid are thereby returned to and entrapped in the cement when the acid becomes entrained. Further, trapped acid phases reduce extraction efficiency and leave residuals of the acid, such as sulfates or phosphates, in the final polymer product.

Another problem with conventional extraction is that the rapid mixing commonly leads to a "rag layer" upon settling. The rag layer is an emulsification of the first and second fluids that will not separate and has no commercial use; it is a waste of an amount of the desired first fluid. Therefore, it would be desirable to have an extraction technology that achieves high extraction efficiency without leaving other residuals in the final product and which reduces or eliminates wasteful rag layer.

It has surprisingly been found that reduction of the level of mechanical agitation during extraction allows for short-time extraction with substantially no residual contaminates or rag layers. In many instances, total extraction times are reduced from those of conventional methods.

SUMMARY OF THE INVENTION

One embodiment of the invention provides a process for extracting and separating extractive components from fluids. A first fluid containing at least one extractive component and an extraction fluid are added to a vessel, thereby creating a two-phase, two-layer system, wherein the first fluid and the extraction fluid are discrete and the two-phase system has a first fluid/extraction fluid interface. The two-phase system is then agitated wherein the first fluid phase and the extraction fluid phase remain as substantially discrete layers. A means for communication between the first fluid and the extraction fluid is provided. The communication of the phases results in the extractive component being extracted from the first fluid into the extraction fluid. Agitation is stopped and the first fluid is recovered having reduced amounts of the extractive component.

Another embodiment provides a method for extracting and separating impurities from polymer cements. A polymer cement and an acid are added to a vessel, thereby creating a two-phase, two-layer system, wherein the polymer cement and the acid are discrete and the two-phase system has a polymer cement/acid interface. The two-phase system is then agitated at a rate that the polymer cement and the acid remain as substantially discrete layers. A means for communication between the polymer cement and the acid is provided. Agitation is stopped and the polymer cement is recovered having reduced impurities.

A third embodiment provides a method for extracting residues from deprotected polymer cements. Residues in deprotected cements are commonly residuals of deprotection solutions, or hydrogenation catalyst, or both. A deprotected polymer cement and water are added to a vessel, thereby creating a two-phase, two-layer system, wherein the polymer cement and the water are discrete and the two-phase system has a polymer cement/water interface. The two-phase system is then agitated at a rate that the deprotected cement and the water remain as substantially discrete layers. A means for communication between the deprotected cement and the water is provided. Agitation is stopped and the deprotected cement is recovered having reduced residuals.

Another embodiment provides a process for mixing a fluid system while maintaining phase separation. A first fluid and a second fluid are added to a vessel, thereby creating a two-phase, two-layer system, wherein the first fluid and the second fluid are discrete and the two-phase system has a first fluid/second fluid interface. The two-phase system is then agitated at a rate that the first fluid phase and the second fluid phase each are well-mixed but remain as substantially discrete layers.

DETAILED DESCRIPTION OF THE INVENTION

The extraction method described works on any multi-phase fluid system. By fluid is meant fluid or slurry and a multi-phase system may consist of fluid, or slurry, or both. The viscosity of the fluid system merely changes the contact and/or settling time but not the process of the invention Therefore, the extraction process works for low viscosity free-flowing liquors as well as high viscosity slurries as long as the fluid containing the impurities and the extraction fluid are of different densities and remain discrete phases when placed in contact.

To practice the extraction process, a first fluid having at least one extractive component is contained in or is added to a vessel. An extraction fluid is added to the vessel, creating a two-phase system wherein the first fluid and the extraction fluid are discrete and the two-phase system has a first fluid/'extraction fluid interface. The two-phase system is then agitated, or mixed, at a rate that ensures the first fluid phase and the extraction fluid phase remain substantially discrete. This may be accomplished, for example by is lowering the agitating speed. Some communication must take place, however, between the phases in order to allow the extraction fluid to contact trap and extract the extractive component. Communication is best accomplished by using a vessel which contains a baffling system. Four longitudinally oriented baffles placed radially at 90 degree intervals around the inner circumference of the vessel have been found to provide excellent communication between the phases.

It is desirable that each phase be well-mixed during the agitation step. This is accomplished, for example, by rotating at least one impeller on a shaft. A flat blade impeller has been found to provide excellent mixing results while keeping the phases substantially discrete. If more than one impeller is used, the preferred positioning is to have a first impeller located in the first fluid and a second impeller located in the extraction fluid. When one impeller is used, or all impellers are located in the same phase, excellent results have been seen when at least one impeller is located very near the first fluid/extraction fluid interface.

Agitation or mixing is continued for a time to allow extractive components in the first fluid to be extracted into the extraction fluid. The agitation is them stopped. It is preferred that the system be allowed to settle after agitation to allow any extraction fluid in the first fluid to separate from the first fluid. However, because the first fluid and the extraction fluid are not dispersed into each other, settling time can be substantially reduced from conventional extraction methods.

The process can be extended to include a second extraction step following the first thereby reducing extractive components in the first fluid to an even lower level. The first batch of extraction fluid is removed from the vessel and a second batch of extraction fluid is added. Once again a two-phase system is created wherein the first phase and the extraction phase are discrete and this second two-phase system has a first fluid/extraction fluid interface. Agitation and settling is performed substantially as described for the first extraction. It has been seen that conducting the second extraction step at a lower agitation speed than the first extraction step helps reduce rag layers.

The process of the invention may be run as a batch or a continuous process. If a continuous process is used, the fluids would pass to a settling vessel to allow any entrained fluid to settle out.

DETAILED DESCRIPTION OF THE PREFERRED EMBODIMENTS

By way of example, the extraction method described has been found to work exceptionally well on polymer cements, particularly cements of polymerized conjugated dienes. These polymers may be mono-ols, diols or epoxidized polymers and have number average molecular weights between the range of about 1,000 and 250,000 as measured by gel permeation chromatography. Solids contents of the polymers range from about 20% wt to about 50% wt, based upon the total weight of the cement. The polymer cements may also be block copolymers of monovinyl aromatic and conjugated diene, such as ABA linear copolymers where A is a monovinyl aromatic such as styrene and B is a conjugated diene.

Anionic polymerization of conjugated diene hydrocarbons with lithium initiators is well known as described in U.S. Pat. Nos. 4,039,503 and Re. 27,145, which descriptions are incorporated herein by reference. Polymerization commences with a monolithium, dilithium, or polylithium initiator which builds a living polymer at each lithium site.

Anionic polymerization is terminated by addition of a component which removes the lithium. For example, termination with water removes the lithium as lithium hydroxide and termination by addition of an alcohol removes the lithium as a lithium alkoxide. The termination of living anionic polymers to form functional end groups is described in U.S. Pat. 4,417,029, 4,518,753 and 4,753,991 which are herein incorporated by reference.

Following termination, the polymers may be hydrogenated to reduce unsaturation of the polymerized conjugated diene, particularly when the conjugated diene is butadiene. Hydrogenation of at least 90%, preferably at least 95%, of the unsaturation in butadiene polymers is achieved with nickel catalysts as described in U.S. Pats. Re. 27,145 and 4,970,254 which are incorporated by reference herein.

The termination and hydrogenation steps result in release of fine particles of lithium bases, nickel and aluminum which must be separated from the polymer. The lithium bases may be separated before the hydrogenation step, or they may be separated with the nickel and aluminum after hydrogenation. Conventional methods of separation after hydrogenation are to either disperse acids, such as sulfuric or phosphoric acid, into the polymer cement or to disperse the polymer cement into acids. Both conventional processes involve rapid mixing for a period of time, followed by allowing the material to settle and separate. Rapid mixing leads to a fully dispersed system of aqueous acid in the polymer cement and, even after settling times of 120 minutes or greater, entrained acid phases remain in the polymer cement. It has been found that any nickel and/or lithium successfully extracted to the acid are returned to and entrapped in the cement by way of the entrained acid. Therefore, the entrained acid reduces extraction efficiency and leaves residuals, such as sulfates or phosphates, in the final polymer product.

The process of the present invention drastically changes this conventional separation, or wash step. After hydrogenation is complete, an aqueous acid solution is added to a vessel containing a polymer cement, thereby creating a two-phase acid/polymer cement system. The acid phase and cement phase are discrete at this point and a distinct acid-polymer cement interface is present. The two-phase system is agitated or mixed at a rate that is low enough to ensure that the acid and the polymer cement phases remain substantially discrete. Although conventional wisdom would indicate that lowering the rate of mixing would result in intolerably long extraction times, it has been found that as long as some communication beyond the interface contact takes place between the phases at this low speed, the acid will trap and extract lithium, nickel and aluminum. Communication may be accomplished by using a vessel which contains a baffling system, such as several longitudinally oriented baffles placed radially at intervals around the inner circumference of the vessel.

It is desirable that each phase remain well mixed during the agitation step. This is accomplished by the use of any means which will keep the phases separated but individually well-mixed. As earlier described, mixing by rotating at least one impeller on a shaft can result in phases which are well mixed but substantially separated.

Mixing continues for up to 30 minutes and then the agitation is stopped. It is preferred that the system be allowed to settle after agitation to allow the acid to separate from the polymer cement. For practical purposes, the settling is usually complete in less than 15 minutes, after which time no more appreciable amount of entrained fluid will be removed.

For certain polymers high levels of lithium initiator or high levels of hydrogenation catalyst may be used to produce the polymers. In these cases, removal of the metals to an acceptable residual level occasionally requires a second wash step, substantially the same as the first wash. It has been found that further reducing the speed of agitation of the second wash step, as compared to the speed of the first wash step, reduces the occurrence of rag layer.

A conventional wash in which the acid and polymer cement phases are fully dispersed needs only about a minute of contact time to extract the metals but requires a settling time of 120 minutes or greater to segregate out enough entrained acid and residuals to produce a marketable product. The process of the invention requires an average of 30 minutes contact time but a settling time of only 15 minutes, after which time very little entrained acid remains in the cement. Therefore, the total wash cycle of the invention is about 1¼ hours shorter in duration than the conventional wash. Even if a second wash is required, a savings of about 30 minutes is seen. Such shortened process times can result in significant savings during commercial production.

An additional advantage to the slow agitation process is the reduction or elimination of a rag layer. Conventional wash methods can result in a certain amount of polymer that forms an emulsion with the acid. Upon settling, this highly stable emulsion settles between the cement layer and the acid layer and is called a "rag layer." The acid will not settle out of the rag layer, and the acid is in too high a concentration for the polymer in this layer to be of any use. Thus, reduction of the rag layer increases the product yield, another significant advantage for commercial production.

By way of another example, the extraction method may be used to extract residuals from a polymer deprotection step. When certain polymerization initiators are used, such as a protected functional initiator (PFI) as described in U.S. Pat. Nos. 5,391,663 and 5,416,168, whose descriptions are incorporated herein by reference, a chain end of the polymer may contain residue of the lithium initiator. After polymerization and hydrogenation, this initiator residual at the front of the polymer chain must be removed to generate the desired functional group. This step is often referred to as deprotection. A variety of processes for removal of the protecting group are known; for a review, see T. W. Greene, "Protective Groups in Organic Synthesis," J. Wiley and Sons, New York, 1981. Deprotection preferably involves easily handled, relatively low toxicity, inexpensive reagents and mild, low cost process conditions. For example, deprotection of a low viscosity functionalized polymer which has been polymerized using a PHI such as described in U.S. Pat. No. 5,416,168 is accomplished by contacting the cement with a solution of methanesulfonic acid, water, and an alcohol in the presence of oxygen, oxidizing the catalyst and hydrolyzing the protecting group. After deprotection the cement contains methanesulfonic acid, which must be removed.

Using the process of the invention, water is added to a vessel containing the deprotected cement, thereby creating a two-phase system, wherein the deprotected cement and the water are discrete and the two-phase system has a deprotected cement/water interface. The system is them agitated as already described herein such that the two phases remain substantially discrete, and wherein some communication takes place between the two phases. The acid is extracted from the deprotected cement into the water. When agitation is stopped, a deprotected cement substantially free of acid is recovered.

In another embodiment of the invention, a method is provided for mixing phases of a multi-phase system while maintaining phase separation. A first and a second fluid are added to a vessel, thereby creating a two-phase two-layer system wherein the first fluid and the second fluid are discrete and the two-phase system has a first fluid/second fluid interface. The two-phase system is agitated at a rate wherein the first fluid and the second fluid are each individually mixed but wherein the first fluid and the second fluid remain as substantially discrete layers.

EXAMPLES

1. Laboratory Studies

The extractions were conducted in a 1-gallon laboratory extraction unit which consisted of a jacketed glass vessel with a hot water bath connected to the jacket. The level of liquid in the vessel was typically maintained so that the ratio of the depth of liquid to the inside diameter of the vessel was approximately 1:1. Two flat-blade 2-inch diameter turbines, each containing six blades, were positioned in the vessel to provide agitation. Four baffles ¾-inch wide were placed radially at 90° inside the vessel. Nickel oxidation was accomplished by delivering 3% mol oxygen/97% mol nitrogen via a ⅛-inch tube placed just below the lower flat blade turbine. The oxygen/nitrogen mix was delivered from a cylinder and metered with a rotameter.

The polymer cement contained hydrogenated ethylene butylene mono-ol having molecular weight of about 3800 and with a primary hydroxyl functionality at one end of the molecule, and hydrogenation catalyst. Cement was added to the vessel and agitated while heating to an extraction temperature of 60° C. (140° F.). 85% wt phosphoric acid was diluted directly with deionized water to the desired acid concentration. The acid was then heated to the extraction temperature and then added to the cement, at the desired agitator speed for the extraction. Immediately after acid addition, 3% mol oxygen addition was delivered to the extraction vessel at 5 SCFH for approximately 2 minutes. The cement/acid mixture was agitated for 30 minutes. Agitation was then shut-off and settling was allowed to occur for 1 hour. Final cement, aqueous, and rag phases, if present, were weighed. The amount of entrained water in the cement was calculated and used as an indication of the amount of entrained acid, as the acid concentration the entrained aqueous phase is the same as that in the original aqueous phase.

The cement was analyzed for lithium, nickel and aluminum. Lithium was analyzed via ion chromatography. "Concentrated" aluminum and nickel (>10 ppmw) were measured using Direct Current Plasma-Atomic Emission, while "dilute" nickel and aluminum (<10 ppmw) were measured using Inductively Coupled Plasma-Atomic Emission. The percent weight polymer in the cements was determined by gravimetric analysis. Results are shown in Table 1.

TABLE 1

Results of Laboratory Extraction Studies

| Run No. | Solids Conc (% wt) | Impeller Speed (rpm) | Acid Conc. (% wt) | Acid to Cement Phase Ratio (v/v) | Entrained Water After Separation[a] (ppmw) | Lithium in Cement (ppmw) | Nickel in Cement (ppmw) | Rag Layer (% wt of cement) |
|---|---|---|---|---|---|---|---|---|
| A. Acid Concentration and Phase Ratio Varied | | | | | | | | |
| 2 | 13.3 | 1500 | 3 | 0.2 | 4400 | 7.5 | 5.2 | 2 |
| 3 | 13.3 | 1500 | 3 | 0.4 | 7300 | 9 | 3.6 | 1 |
| 4 | 13.3 | 1500 | 6 | 0.2 | 6900 | 18 | 7.2 | 3 |
| 5 | 13.3 | 1500 | 6 | 0.4 | 2700 | 9.1 | 3.5 | 8 |
| B. Solids Concentration and Phase Ratio Varied | | | | | | | | |
| 6 | 15 | 1500 | 3 | 0.2 | 4500 | 18 | 3.9 | 0 |
| 7 | 20 | 1500 | 3 | 0.2 | 4100 | 5.5 | 3.6 | 0 |
| 8 | 25.4 | 1500 | 3 | 0.2 | 5670 | 11 | 6.1 | 12 |
| 9 | 15 | 1500 | 3 | 0.4 | 12000 | 11 | 6.6 | 2.5 |
| 10 | 25.4 | 1500 | 3 | 0.4 | 23000 | 17 | 1.9 | 16 |
| C. Impeller Speed Varied | | | | | | | | |
| 11 | 20 | 900 | 3 | 0.2 | 4200 | 34 | 1.4 | 0 |
| 12 | 20 | 400 | 3 | 0.2 | — | 3.7 | 1 | — |
| 13–15 min | 20 | 1000 | 3 | 0.2 | 6000 | 15 | 1 | |
| 30 min | | | | | 7000 | 10 | 1 | |
| 45 min | | | | | 6900 | 9 | 1 | |
| 60 min | | | | | 6600 | 13 | 1 | 0 |
| 14–15 min | 20 | 1250 | 3 | 0.2 | 3600 | | | |
| 30 min | | | | | 2600 | | | |
| 45 min | | | | | 1600 | | | |
| 60 min | | | | | 980 | 4.6 | 2 | 0 |
| 9 | 20 | 1500 | 3 | 0.2 | 4100 | 5.5 | 3.6 | 0 |
| D. Single Wash Extraction | | | | | | | | |
| 14 | 20 | 1250 | 3 | 0.2 | 980 | 4.6 | 2 | 0 |
| 15 | 20 | 1250 | 3 | 0.2 | 11400 | 11.6 | 2 | 0 |
| 20 | 20 | 1250 | 3 | 0.2 | 6140 | <1 | <0.2 | 4 |
| E. Double Wash Extraction | | | | | | | | |
| 22-1st Wash | 20 | 1250 | 3 | 0.2 | 450 | 6 | 12 | 0 |
| -2nd Wash | | 1250 | | | 2630 | <1 | <0.2 | 3 |
| 24-1st Wash | 20 | 1250 | 3 | 0.2 | 1300 | <1 | 0.4 | 0 |
| -2nd Wash | | 1250 | | | 4600 | <1 | — | 2.7 |
| F. Reduction of Rag Layer After Second Wash | | | | | | | | |
| 20-1st Wash | 20 | 1250 | 3 | 0.2 | 6140 | 6 | 5 | 0 |
| -2nd Wash | | 1250 | | 0.1 | 5700 | <1 | <0.2 | 4 |
| 23-1st Wash | 20 | 1250 | 3 | 0.2 | 1300 | 1.7 | 1.2 | 0 |
| -2nd Wash | | 1250 | | | 4600 | <1 | <0.2 | 7.7 |
| 27-1st Wash | 20 | 1250 | 4 | 0.2 | 2700 | 2.2 | 0.7 | 0 |
| -2nd Wash | | 1250 | | | 3370 | <2 | — | 3.8 |
| 35-1st Wash | 20 | 1250 | 3 | 0.2 | 660 | 1.6 | 1.6 | 0 |
| -2nd Wash | | 720 | | | 420 | <1 | <1 | 0 |
| 37-1st Wash | 20 | 1250 | 3 | 0.2 | 4600 | 5.4 | 5.4 | 0 |
| -2nd Wash | | 720 | | | 1760 | <1 | <1 | 0 |

[a]Unless otherwise indicated, measurement is after 1 hour of separation time.

The process variables that are perceived to affect the extraction step significantly are (i) temperature, (ii) acid concentration, (iii) acid-to-organic phase ratio, (iv) contact time, (v) settling time, (vi) impeller speed, and (vii) polymerization termination byproducts. The desired requirements for extraction in these studies were (i) removal of nickel and lithium to 10 ppmw or less, (ii) mini on of entrained acid, and (iii) minimization of rag layer. It can be seen from the results shown in Table 1 that the efficiency of extraction of nickel and lithium is directly tied to the percentage of acid entrained in the cement. In the first stage of extraction, virtually all the nickel and lithium were transferred to the acid phase. The loss of extraction efficiency occurred when the acid phase remained entrained in the cement phase, thereby introducing nickel and lithium back into the cement.

The acid concentration and phase ratio were varied in Study A. The highest degree of rag formation occurred at an acid concentration of 6% and an acid-to-organic phase ratio of 0.4 (Run 5). At a phase ratio of 0.2, no significant advantage was seen in using a higher acid concentration (Runs 2 and 4). However, when the acid concentration was held constant at 3% wt, an increased phase ratio resulted in about a 75% increase in entrained water (Runs 2 and 3).

The solids concentration and the phase ratio were varied in Study B. The results support the findings of Study A. At similar conditions, an increase in phase ratio from 0.2 to 0.4 increased the entrained water about three times (Runs 6 and 9). Study B also revealed a sensitivity of rag layer formation to solids level, all other conditions being constant (Runs 6, 7, and 8).

Impeller speed was varied in Study C. The acid concentration and phase ratio were maintained at 3% wt and 0.2 respectively. Samples were removed at 15, 30, 45 and 60 minutes of contacting time. It can be seen that extraction is essentially complete at 15 minutes.

Studies D and E looked at the efficiency of one extraction step versus two extraction steps. The results suggest that a second wash may be necessary to lower some residuals to the desired level. However, the second wash created a rag layer so Study F was conducted to look at reducing this rag layer. It can be seen that of the various variables which were altered, reduction of impeller speed had the greatest affect (Runs 35 and 37).

2. Field Studies a. A mono-ol (ethylene butylene, approximately 3800 Mw, alcohol functionality) test run was carried out under similar conditions to those previously described, only in a commercial size vessel with a volume phase ratio of 0.2 acid/cement, 30 minute extraction time, 60° C. (140° F.) extraction temperature, and various settling times. The acid concentration was 3.5% wt. The acid and cement phases were contacted during two washes, both at an impeller speed of 35 rpm, to give a tip speed of 550 ft/min. Under these mixing conditions, samples were taken from the commercial size vessel from the bulk cement and the acid phases. These samples observed less than 1% acid in the cement phase by volume, and less than 1% cement in the acid phase by volume, suggesting that the extractions occurred with extreme stratification in the commercial vessel. The extraction results are shown in Tables 2 and 3.

TABLE 2

Field Extraction Studies - Mono-ol

| Batch # | Wash Step | Contact Time (min) | Settling Time (min) | Nickel in Cement (ppmw) | Lithium in Cement (ppmw) | Entrained Water (ppmw) | Phosphate in Cement[a] (ppmw) |
|---|---|---|---|---|---|---|---|
| 1 | First | 30 | 120 | 0.3 | 0.81 | 458 | — |
|   | Second | 30 | 140 | 0.3 | 0.36 | 398 | 12.3 |
| 2 | First | 30 | 120 | 0.51 | 2.1 | 642 | — |
|   | Second | 30 | 140 | 0.31 | 0.6 | 706 | 30 |
| 3 | First | 30 | 120 | 1.05 | 0.65 | 2030 | — |
|   | Second | 30 | 140 | 0.21 | 1.92 | 1923 | 91 |
| 4 | First | 30 | 120 | 0.24 | 1.72 | 646 | — |
|   | Second | 30 | 140 | 0.18 | 0.45 | 428 | 22 |
| 5 | First | 30 | 60 | 0.68 | 9.5 | 1521 | — |
|   | Second | 30 | 60 | 0.08 | 0.92 | 869 | 31.4 |
| 6 | First | 30 | 60 | 0.6 | 5 | — | — |
|   | Second | 30 | 40 | 0.7 | — | 196 | — |
| 7 | First | 30 | 60 | — | 1 | 622 | — |
|   | Second | 30 | 60 | 0.11 | — | 1390 | 36.2 |
| 8 | First | 30 | 60 | 0.13 | 1 | 683 | — |
|   | Second | 30 | 60 | 5.3 | 1.9 | 408 | 65 |
| 9 | First | 30 | 60 | 0.67 | 5 | — | — |
|   | Second | 30 | 60 | 0.12 | 1 | — | 19 |
| 10 | First | 30 | 60 | 0.4 | 3 | — | — |
|   | Second | 30 | 60 | 0.2 | 1 | 865 | 19 |
| 11 | First | 30 | 60 | 0.45 | 3 | — | — |
|   | Second | 30 | 60 | 0.12 | 1.2 | 658 | 28 |

[a]Phosphoric acid residue

TABLE 3

Batch Extraction and Settling Field Studies - Mono-ol

| Time (min) | Li in Cement (ppmw) | | Ni in Cement (ppmw) | | Entrained Water (ppmw) | |
|---|---|---|---|---|---|---|
|  | 1st Wash | 2nd Wash | 1st Wash | 2nd Wash | 1st Wash | 2nd Wash |
| Acid/Cement Contact Time | | | | | | |
| 0 | 363 | <1 | 63 | <0.2 | | |
| 5 | 198 | 1.5 | 26 | 0.4 | | |
| 10 | 259 | 2.8 | 20 | 0.4 | | |
| 20 | 1.4 | 3.6 | <0.2 | 0.3 | | |
| 30 | <1 | 3.4 | <0.2 | 0.3 | | |
| Settling Time | | | | | | |
| 15 | | | | | 96 | 136 |
| 30 | | | | | 107 | 104 |
| 60 | | | | | 127 | 105 |
| 90 | | | | | 149 | 32 |
| 120 | | | | | 71 | 98 |

Results of commercial scale test on a mono-ol revealed that a contact time of 30 minutes was highly efficient in removing Li and Ni. Extraction was found to be essentially complete at a time between 10 and 20 minutes, so the time may actually be reduced by at least 10 minutes. Further, the settling was essentially completed within the first 15 minutes, as evidenced by the lack of change in entrained water in the cement over time. Therefore, settling time may also be reduced, making an extraction cycle time of less than 45 minutes possible.

b. A diol (ethylene butylene, approximately 3200 Mw, diol functionality) test run was carried out, where extraction of methanesulfonic acid was accomplished with the previously described approach of keeping the cement and wash phase segregated. A commercial size vessel was used with a cement to water phase ratio of 0.1, a 15 minute extraction time, 60° C. (140° C.) extraction temperature, and various settling times. The water and cement phases were contacted at an impeller speed of 30 rpm, to give a tip speed of 420 ft/min. Under these mixing conditions, samples were taken from the bulk cement and the aqueous phases. These samples observed less than 1% aqueous phase in the cement by volume, and than 1% cement phase in the aqueous phase by volume, suggesting that the extractions occurred with extreme stratification in the commercial vessel. The extraction results showed that the methanesulfonic acid concentration in the aqueous acid phase was 9.7% wt methanesulfonic acid after 15 minutes of extraction; a value of approximately 10% wt was expected for complete extraction. Hence the extraction of methanesulfonic acid from the cement was essentially complete after 15 minutes. The water and methanesulfonic acid concentration profile during settling is summarized in Table 4.

TABLE 4

Field Extraction Studies - Diol

| Settling Time After Extraction (min) | MSA in Cement (% w) | Water in Cement (% w) |
| --- | --- | --- |
| 20 | 0.30 | 3.9 |
| 25 | 0.20 | 1.8 |
| 50 | 0.18 | 1.5 |
| 80 | 0.12 | 1.1 |
| 120 | 0.11 | 1.0 |

The results suggest that settling was essentially complete after 80 minutes. No rag layer was observed when decanting the aqueous wash phase from the cement.

c. A test run was carried out where a mono-ol was made as a precursor for epoxidation. The molecule was an isoprene-butadiene block co-polymer with a molecular weight of approximately 6000. The primary goal of this extraction was to remove lithium, as nickel and aluminum levels were significantly lower than in previous examples. The commercial vessel previously described for the mono-ol run was used with a volume phase ratio of 0.2 acid/cement, 30 minute extraction time, 60° C. (140° F.) extraction temperature, and various settling times. The acid concentration was 3.5% wt. The acid and cement phases were contacted during one wash at an impeller speed of 35 rpm, to give a tip speed of 550 ft/s. Under these mixing conditions, samples were taken from the commercial size vessel from the bulk cement and acid phases. These samples observed less than 1% acid in the cement phase by volume, and less than 1% cement in the acid phase by volume, suggesting that the extractions occurred with extreme stratification in the commercial vessel. Results showed that the lithium concentration in the cement dropped from 210 ppm at the beginning of the extraction to 26 ppm five minutes into extraction. The concentration dropped to 8 ppm after 15 minutes and 6 ppm after 30 minutes, suggesting the extraction was essentially complete after 15 minutes. After 30 minutes of extraction time the impeller was turned-off The lithium concentration in the cement was 500 ppb after 2 minutes of settling, 4 ppm after 20 minutes, and 3 ppm after 60 minutes. These results suggest the additional settling time beyond 2 minutes was not beneficial.

3. Impeller Speed

A laboratory scale mixing experiment was carried out to better characterize the contacting pattern of the acid and cement over a range of mixing conditions. A hydrogenated cement was contacted with 3% wt phosphoric acid at a phase ratio of 0.2 and a temperature of 60° C. (140° F. An initial impeller speed of 300 rpm was used, and the impeller speed was then increased. At 300 rpm there was virtually no intimate contacting between the acid and cement. At 400 rpm intimate contacting of the two phases was observed in a small zone (herein referred to as the contacting zone) between discrete acid and cement phases. At 600 rpm small acid droplets were visible in the cement, and the contacting zone grew. At 710 and 900 rpm the contacting zone continued to grow, although distinct acid and cement phases were still clearly present with some dispersion of small droplets in each. Finally, at 1100 rpm, or a tip speed of 570 ft/min, the stratification disappeared and the acid appeared to be completely dispersed into the cement from a macroscopic viewpoint. The results are shown in Table 5.

TABLE 5

Mixing Experiment

| Impeller Speed (rpm) | Tip Speed (ft/min) | Power Per Volume (hp/gallon) | Comments |
| --- | --- | --- | --- |
| 300 | 157 | 0.0003 | Complete segregation; no dispersion of phases |
| 35[a] | 550 | 0.0008 | Acid and cement phases discrete; acid intermingled with cement |
| 550 | 290 | 0.002 | |
| 700 | 370 | 0.004 | Acid and cement phases discrete; contact zone apparent; acid dispersed in cement |
| 900 | 470 | 0.0081 | Acid and cement phases discrete; contact zone apparent; acid intermingled with cement |
| 1100 | 575 | 0.015 | Two phases well-mixed macroscopically |

[a]From commercial scale test

The results of the mixing experiment show that two phase stratification occurs in the different sized vessels at different tip speeds. Consequently, a more accurate scale-up criteria may be power input per unit volume.

While this invention has been described in detail for the purpose of illustration, it is not to be construed as limited thereby but is intended to cover all changes and modifications within the spirit and scope thereof.

We claim:

1. A method for extracting and separating extractive components from a multi-phase fluid system, said method comprising:

passing a first fluid having at least one extractive component to a vessel;

passing an extraction fluid to said vessel, thereby creating a two-phase two-layer system wherein the first fluid and the extraction fluid are discrete and the two-phase system has a first fluid/extraction fluid interface;

agitating the two-phase system at a rate wherein the first fluid phase and the extraction fluid phase remain as substantially discrete layers;

contacting said first fluid and said extraction fluid beyond the interface without dispersing said first fluid in said extraction fluid;

extracting said at least one extractive component from the first fluid into the extraction fluid;

stopping agitation; and recovering the first fluid having reduced extractive components.

2. The method according to claim 1 wherein agitation is accomplished by the rotation of at least one impeller.

3. The method according to claim 2 wherein at least one impeller is located in the first fluid phase and at least one impeller is located in the extraction fluid phase.

4. The method according to claim 1 further comprising separating extraction fluid dispersed in said first fluid from said first fluid by allowing the two-phase system to settle after agitation.

5. The method according to claim 1 wherein no rag layer is formed.

6. A method for extracting and separating impurities from polymer cements, said method comprising:

adding a polymer cement to a vessel;

adding an extraction fluid to the vessel, thereby creating a two-phase two-layer extraction fluid/polymer cement system wherein the extraction fluid phase and the polymer cement phase are discrete and the two-phase system has an extraction fluid/polymer cement interface;

agitating the two-phase system, wherein the extraction fluid and the polymer cement phases remain as substantially discrete layers;

contacting the polymer cement and the extraction fluid beyond the interface without dispersing the polymer cement in the extraction fluid;

extracting impurities from the polymer cement into the extraction fluid;

stopping agitation; and recovering a polymer cement with reduced impurities.

7. The method according to claim 6 wherein agitation is accomplished by the rotation of at least one impeller.

8. The method according to claim 7 wherein at least one impeller is located in the polymer cement phase and at least one impeller is located in the extraction fluid phase.

9. The method according to claim 7 fiber comprising separating said extraction fluid dispersed in said polymer cement from said polymer cement by allowing the two phase system to settle after agitation.

10. The method according to claim 9 wherein the extraction fluid is an acid.

11. The method according to claim 10 wherein a phase ratio of volume of the acid to volume of the cement is less than about 0.5.

12. The method according to claim 11 wherein the phase ratio is about 0.2.

13. The method according to claim 6 wherein no rag layer is formed.

14. A method for extracting impurities from a deprotected polymer cement, said method comprising:

adding a deprotected polymer cement to a vessel, said deprotected polymer cement containing residues;

adding water to said vessel, thereby creating a two-phase two-layer system wherein the deprotected polymer cement and the water are discrete and the two-phase system has a deprotected polymer cement/water interface;

agitating the two-phase system, wherein the deprotected cement and the water remain as substantially discrete layers;

contacting said deprotected polymer cement and said water beyond the interface without dispersing said deprotected cement in said water;

extracting said residues from the deprotection cement into the water;

stopping agitation; and recovering the deprotected polymer cement substantially free of said residues.

15. A method for mixing phases of a multi-phase system while maintaining phase separation, said method comprising:

adding a first fluid to a vessel;

adding a second fluid to said vessel, thereby creating a two-phase two-layer system wherein the first fluid and the second fluid are discrete and the two-phase system has a first fluid/second fluid interface; and agitating the two-phase system, wherein the first fluid and the second fluid are each individually mixed, and wherein the first fluid and the second fluid remain as substantially discrete layers.

16. A method according to claim 15 wherein agitation is accomplished by the rotation of at least one impeller.

17. A method according to claim 16 wherein at least one impeller is located in the first fluid and at least one impeller is located in the second fluid.

* * * * *